Feb. 23, 1932.  A. H. DANDRIDGE  1,846,794
DIRECTION SIGNALING DEVICE FOR AUTOMOBILES
Filed March 24, 1930

Arthur H. Dandridge
Inventor
Attorney

Patented Feb. 23, 1932

1,846,794

UNITED STATES PATENT OFFICE

ARTHUR HERBERT DANDRIDGE, OF DUNCAN, BRITISH COLUMBIA, CANADA

DIRECTION SIGNALING DEVICE FOR AUTOMOBILES

Application filed March 24, 1930, Serial No. 438,625, and in Canada August 12, 1929.

This invention relates to an automobile direction signaling device, for cars of the closed body type. Its principal object is to provide a mechanism of this character which utilizes the window operating gear for motivating the signaling device thereby avoiding additional elements and greatly simplifying the cost of the components required. In carrying out my invention I use by preference a semaphore of the index form pivotally mounted on a small bracket, which may conveniently extend from the upper hinge of the driver's door. A contacting projection which forms part of the small arm of a lever of the first order of which the said pivot is the fulcrum and the semaphore the long arm, engages another contacting projection secured to the upper portion of the window glass and movable with it. By this arrangement when the window is lowered a few inches from the entirely closed position by the small hand crank in the usual way, the semaphore is correspondingly actuated and the usual code signals quickly and easily made.

Figure 1:
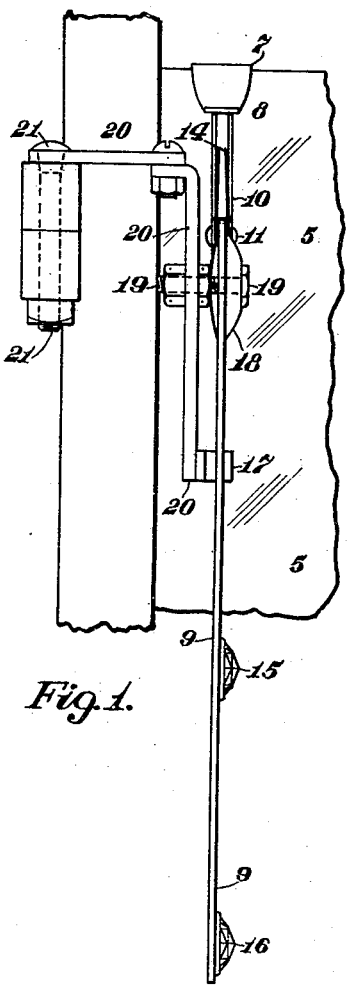
Figure 2:
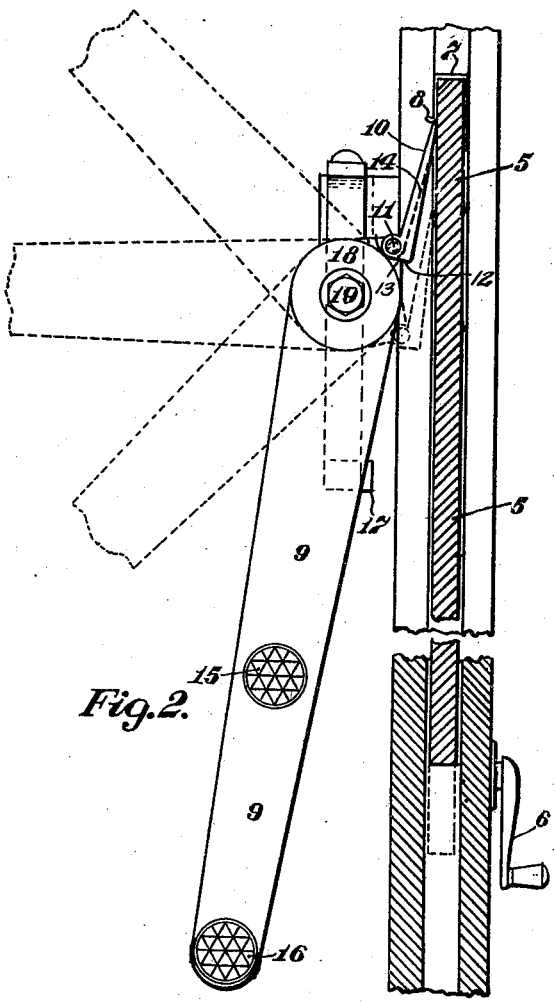

The invention is more clearly described by the aid of the drawings accompanying and forming a part of this application, and in which Fig. 1 is a front elevation of the device which is positioned near the front upper corner of the driver's door, Fig. 2 is a side elevation of the device with the glass of the window shown in section.

In these drawings the numeral 5 indicates the glass of the car window adjacent the driver's seat, and which is raised or lowered by the operation of the hand crank 6. Secured by cement to the top edge of the glass is the clip member 7 which terminates on the outer side in a curved projection 8 which engages the semaphore mechanism and motivates the signal device. This latter comprises a lever of the first order the long arm of which forms the semaphore 9, the short arm 10 being hinged at the pin 11 and provided with a shoulder 12 for bearing against the flat surface 13 whereby the short arm may move the semaphore in one direction only. The outer extremity of the short arm contacts the curved projection 8 and is retained in contact therewith or against the window glass by the combined action of the spring 14 and the weight of the semaphore 9 reacting against the flat surface 13. Jewels of red glass are secured to the rear surface of the semaphore at 15 and 16 and a stop 17 is provided to engage the edge of the semaphore when the latter is at rest in the bottom position as shown. The semaphore is provided with a boss 18 to form a bearing for the fulcrum pin 19, held in the member 20 which carries at its lower end the stop 17 and forms an extension of the bracket plate 20 which is engaged and secured by the door hinge pin 21.

The operation of the device is as follows: when a "stop" signal is to be made the glass is lowered a slight distance only and the semaphore is correspondingly raised by the downward pressure of the window clip 7 on the extremity of the hinged short arm 10 which passes direct to the flat 13. A corresponding further motion gives the left turn signal and continued motion the right turn signal. Immediately any one of these is discontinued the window is raised, the hinged arm 10 still contacting the projection 8 or the surface of the glass of the window, thus permitting the semaphore to fall by gravity until arrested by the stop 17.

Having now fully described the nature of my said invention, what I claim and desire to secure by Letters Patent, is:

A direction signaling device for automobiles of the closed body type and in which a lever of the first order is used the outwardly projecting long arm of which is adapted to form a semaphore operating in a vertical plane right-angular to the side of the body of said automobile, the combination of a short arm to said lever having a hinged extremity projecting upwardly and angularly towards the window of said automobile, a pivotal bracket secured on the hinge door post of said automobile, a fulcrum pin carried by said bracket and supporting said lever, a contacting member clipping the top edge of said window and adapted to engage the said hinged projection, a spring member adapted to retain the two said engaging members in contact, whereby when the window at the driver's left hand is lowered by the usual crank device the contacting members engage to depress the short arm and raise the long arm of the lever-semaphore.

In witness whereof I have hereunto affixed my signature.

ARTHUR HERBERT DANDRIDGE.